Figure 1:
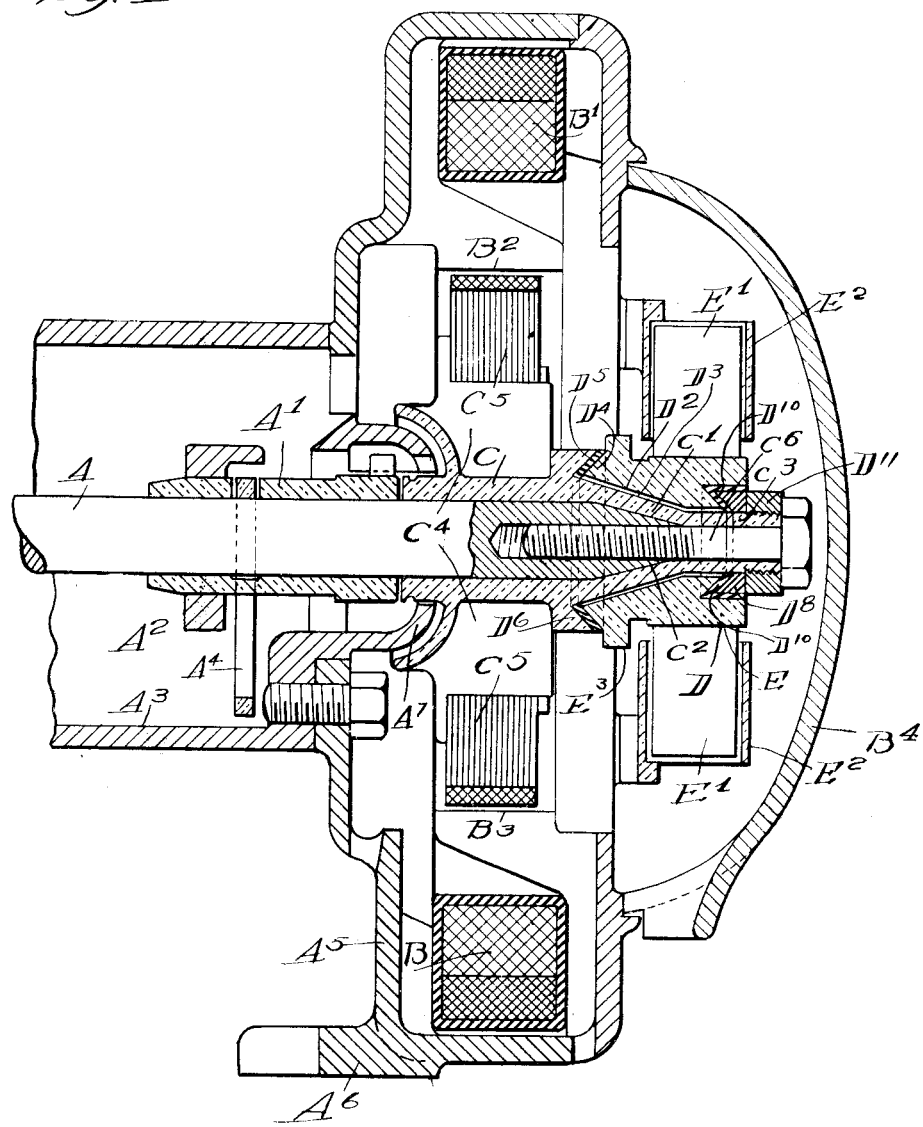

C. W. DAKE.
ARMATURE.
APPLICATION FILED APR. 25, 1913.

1,109,825.

Patented Sept. 8, 1914.
2 SHEETS—SHEET 1.

C. W. DAKE.
ARMATURE.
APPLICATION FILED APR. 25, 1913.
1,109,825.
Patented Sept. 8, 1914.
2 SHEETS—SHEET 2.
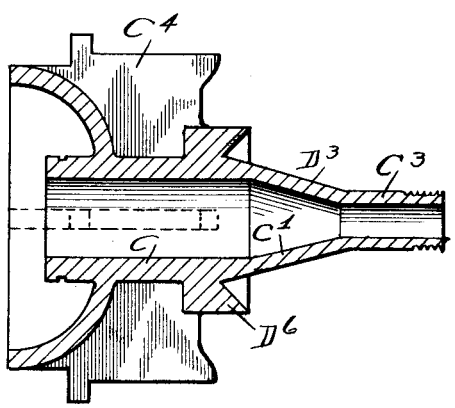
Fig. 2.
Fig. 3.
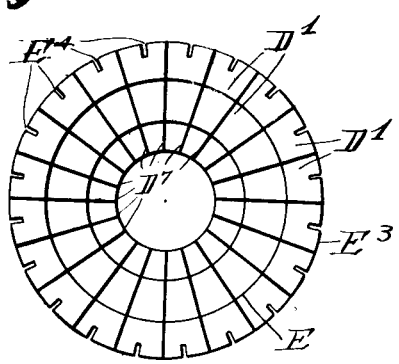
Fig. 4.
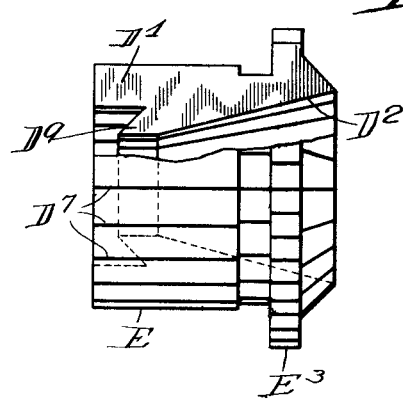
Fig. 5. Fig. 6. Fig. 7. Fig. 8.
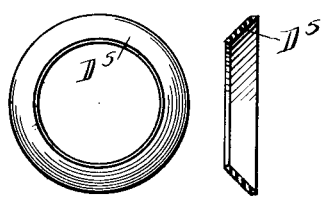
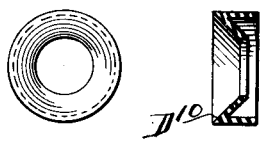
Witnesses:
Inventor
Charles W. Dake.
by Parker & Carter
his Attys.

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

ARMATURE.

1,109,825.  Specification of Letters Patent.  Patented Sept. 8, 1914.

Application filed April 25, 1913. Serial No. 763,510.

*To all whom it may concern:*

Be it known that I, CHARLES W. DAKE, a citizen of the United States, residing at Chicago, in the county of Cook and State of Illinois, have invented a certain new and useful Improvement in Armatures, of which the following is a specification.

My invention relates to improvements in armatures for electrical machinery and the like.

It is illustrated diagrammatically in one form in the accompanying drawings, wherein—

Figure 1 is a section; Fig. 2 a detail section through the hub; Fig. 3 is an end elevation of the commutator; Fig. 4 is a side elevation of the commutator with parts broken away; Fig. 5 is a plan view of and Fig. 6 is a section through the insulating collar interposed between the commutator and the hub; Fig. 7 is a plan view of and Fig. 8 is a section through the insulating collar interposed between the commutator and the holding washer.

Like parts are indicated by the same letters throughout the several figures.

The shaft $A$ is mounted in a bearing $A^1$ supported by the bracket $A^2$ and the housing sleeve $A^3$ and lubricated by the oiling ring $A^4$.

$A^5$ is a housing rigidly attached to the end of the bearing supported by the foot $A^6$.

$A^7$ is an oil flange or a guard projecting inwardly into the housing $A^5$ from the end of the sleeve $A^3$ and adapted to serve as a shield for the end of the bearing to prevent the discharge of oil into the housing $A^5$.

$B$, $B^1$ are field coils located within the housing $A^5$ and adapted to excite the field magnets $B^2$, $B^3$ located concentrically with the shaft $A$.

$B^4$ is a cap closing the outer side of the housing $A^5$ and protecting the end of the shaft $A$ and associated parts.

$C$ is a hub slidable on the end of the shaft $A$ provided with a conical portion $C^1$ in parallelism with the tapered end $C^2$ of the shaft $A$.

$C^3$ is a sleeve extending outwardly from the smaller end of the conical portion $C^1$ of the hub $C$.

$C^4$ is a spider mounted on the hub $C$.

$C^5$, $C^5$ are armature coils supported on the spider.

$C^6$ is a cap screw screw-threaded in the end of the shaft $A$ and bearing against the end of the sleeve $C^3$, adapted when tightened to draw the hub $C$ onto the end of the shaft and clamp the conical portion $C^1$ of the hub against the tapered end $C^2$ of the shaft, thus centering the hub upon the shaft independent of the relation between the cylindrical portion of the hub and the shaft.

$D$ is a commutator made up of the tapered commutator segments $D^1$, $D^1$ having the inclined inner surface $D^2$ in engagement with the inclined surface $D^3$ on the hub and provided with angular fingers $D^4$ engaging the insulating ring $D^5$ backed against the undercut flange $D^6$ on the hub $C$.

$D^7$, $D^7$ are insulated mica sheets interposed between the commutator segments $D^1$, $D^1$.

$D^8$ is an undercut collar or sleeve slidable on the sleeve $C^3$ having interposed between it and the fingers $D^9$ the commutator segments $D^1$ and the insulating collar $D^{10}$.

$D^{11}$ is a nut screw-threaded on the sleeve $C^3$ adapted to be rotated to force the collar $D^8$ against the commutator segments, thus locking them between the two undercut sleeves $D^6$ and $D^8$ and thus centering them upon the hub.

$E$ is the cylindrical contact portion of the commutator.

$E^1$, $E^1$ are brushes mounted in the brush holders $E^2$ and in engagement with the cylindrical portion of the commutator $E$.

$E^3$ are lugs outwardly projecting from the commutator segments slotted at $E^4$ to make electrical contact with the armature windings not shown.

It will be evident that while I have shown this device as applied to an armature, still it is quite conceivable that it might be applied to other types of electrical equipment or even, without changing the subject matter of my invention, to machinery not necessarily electrical, but for the purpose of convenience I have illustrated it as applied to an armature of an electrical machine.

The use and operation of my invention are as follows: The device is assembled by first holding or otherwise attaching the armature housing to the supporting sleeve and then inserting the shaft in the bearing in the sleeve so that it projects into the armature housing as indicated, the field magnets, coils and connections being placed in the usual manner. The commutator segments will then be adjusted upon the hub, being separated from the hub by the insulated collars as indicated and from each other by the usual mica strips as indicated. The tightening up of the nut on the sleeve-like reduced end of the hub will firmly clamp all the commutator segments together in position with respect to the hub, and owing to the conical shape of the clamping surface will inevitably center the commutator segments, which will be held firmly in position by the overhanging portions of the sleeves which overlie the inclined surface fingers on the segments. The armature coils will be positioned on the spider and hub in the usual manner and connected to the commutator segments in the usual manner, preferably, of course, by upsetting the terminal wires which in the meanwhile have been placed in the slots shown as part of the commutator segments. The assembled armature will then be placed on the shaft and when the cap screw is tightened up the hub will be centered on the shaft by means of the contact between the conical portion thereof and the tapered end of the shaft. It will be noted that by this arrangement the shaft does not need to pass clear through the hub and commutator, and that, therefore, the hub may be reduced in diameter, thus permitting a very material reduction in the diameter of the commutator, which reduction of course leads to much more satisfactory commutator arrangement owing to lower peripheral speeds, thus decreasing the tendency toward chattering, sparking, wearing away of the brushes and segments and the like. The guard flange as indicated, of course prevents the discharge of oil from the bearing into the armature housing, thus protecting the insulation against damage by the oil.

I claim:

1. A support for a commutator comprising a tapered hub, an undercut flange located at the larger portion of said hub, a sleeve projecting outwardly from the smaller portion of said hub and an undercut collar slidable on said sleeve in opposition to said flange, and means for forcing said collar toward said flange and holding it in position.

2. A commutator comprising a tapered hub, an undercut flange about the larger portion of said hub, commutator bars grouped about said hub having outwardly extending fingers underlying the undercut flange, a cylindrical extension projecting outwardly from the small end of said hub, fingers on said commutator bars beneath the working surfaces thereof, a collar slidable on said sleeve and undercut to overlie said fingers, and means for forcing said collar against said fingers.

3. A hub for electric armatures and the like having a truncated conical portion, an undercut flange about the larger portion of said cone, commutator segments peripherally arranged about said truncated conical portion having inclined fingers projecting under said undercut flange, a cylindrical extension projecting outwardly from the upper smaller end of said truncated conical portion and a collar having an undercut portion slidable upon said sleeve and overlying fingers on said commutator segments and means for drawing said collar and said flange together to clamp said commutator segments.

4. A rotor for electric machines comprising an armature and commutator hub, a shaft upon which said hub is mounted, a commutator located at one end of said hub, an armature at the other, said hub being cylindrically apertured through the commutator end, a truncated conical contact portion in the commutator end of the hub, a cylindrical shaft upon which said hub is mounted having a tapered end in close contact with said truncated conical portion and means for drawing said shaft and said hub longitudinally together to center the end of the hub on the shaft.

In testimony whereof, I affix my signature in the presence of two witnesses this 18th day of April, 1913.

CHARLES W. DAKE.

Witnesses:
 MINNIE SUNDFAR,
 MINNIE M. LINDENAU.

---

Copies of this patent may be obtained for five cents each, by addressing the "Commissioner of Patents, Washington, D. C."